Figure 1:
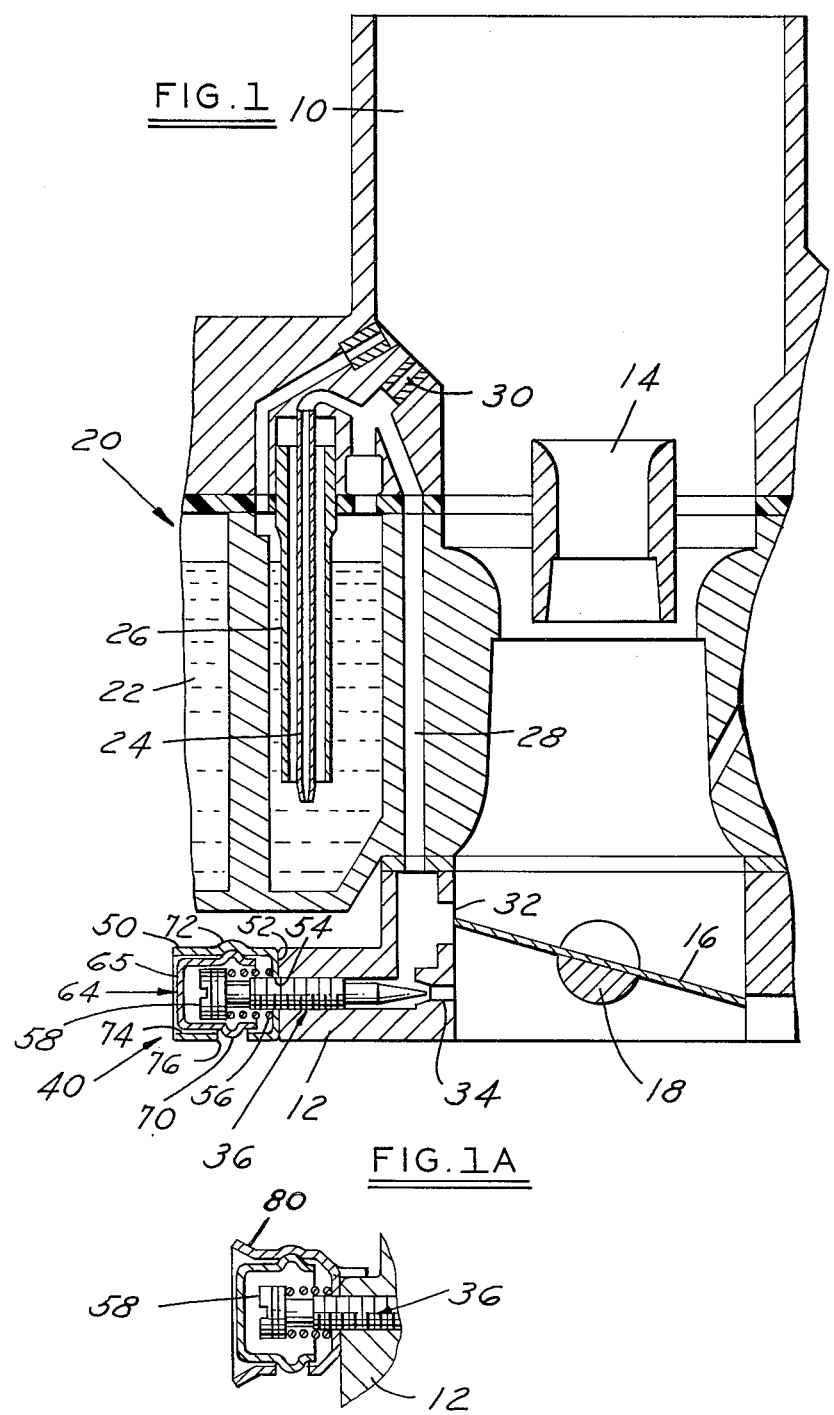

United States Patent [19]

Handelsman et al.

[11] 4,242,290
[45] Dec. 30, 1980

[54] CARBURETOR IDLE MIXTURE SCREW ENCLOSURE ASSEMBLY

[75] Inventors: Steven K. Handelsman; Albert A. Pruchno, both of Southfield, Mich.

[73] Assignee: Ford Motor Company, Dearborn, Mich.

[21] Appl. No.: 62,089

[22] Filed: Jul. 30, 1979

[51] Int. Cl.³ .............................................. F02M 3/08
[52] U.S. Cl. .................... 261/41 D; 261/71; 261/DIG. 38; 85/55; 137/382; 137/383; 292/251
[58] Field of Search .............. 261/DIG. 38, 41 D, 71; 137/382, 383; 85/55; 292/251

[56] References Cited

U.S. PATENT DOCUMENTS

| | | | |
|---|---|---|---|
| 2,033,371 | 3/1936 | Benaggio | 261/DIG. 38 |
| 2,618,473 | 11/1952 | Whitford | 261/DIG. 38 |
| 3,321,195 | 5/1967 | Korte | 261/DIG. 38 |
| 3,618,906 | 11/1971 | Charron | 261/DIG. 38 |
| 4,097,561 | 6/1978 | Seki et al. | 261/DIG. 38 |
| 4,162,740 | 7/1979 | Jones | 137/382 |

FOREIGN PATENT DOCUMENTS

| | | | |
|---|---|---|---|
| 2548226 | 5/1976 | Fed. Rep. of Germany | 261/DIG. 38 |
| 2634441 | 2/1977 | Fed. Rep. of Germany | 85/55 |
| 2552100 | 6/1977 | Fed. Rep. of Germany | 261/DIG. 38 |
| 2331691 | 6/1977 | France | 261/DIG. 38 |
| 231366 | 4/1925 | United Kingdom | 85/55 |

*Primary Examiner*—Tim R. Miles
*Attorney, Agent, or Firm*—Robert E. McCollum; Clifford L. Sadler

[57] ABSTRACT

A carburetor idle speed set screw is enclosed by an assembly that prevents access to the screw so long as the assembly is in place, and, therefore, prevents adjustment of the set screw; the assembly includes a lower cup-shaped base member nested with an inverted cup-shaped cap having resilient fingers insertable within the lower member and held therein in a spring-lock detent-like manner by mating beads or dimples.

1 Claim, 3 Drawing Figures

CARBURETOR IDLE MIXTURE SCREW ENCLOSURE ASSEMBLY

This invention relates in general to an automotive type carburetor, and more particularly, to the idle system.

The conventional carburetor contains a main air/fuel induction passage that supplies all of the engine fuel requirements during part throttle and wide open throttle operating conditions. During idle speed operation, when the throttle valve is essentially closed, the engine is kept running by routing fuel to the engine through a bypass channel around the throttle valve. The quantity of flow through this channel is controlled by a needle valve type set screw that is threaded into the discharge opening connecting the channel to the induction passage. The initial setting of this needle valve is usually made at the factory, to meet emission requirements and to allow for differences in engine tolerances, and further adjustments are not generally needed unless repair of the carburetor becomes necessary. It will be clear, therefore, that adjustment of the set screw or needle valve to provide greater flow may result in an emission of unburned hydrocarbons and other undesirable elements into the atmosphere.

It is, therefore, a primary object of the invention to provide an enclosure assembly for the idle mixture set screw of a carburetor, which, when once assembled to the carburetor, will prevent adjustment of the idle mixture screw so long that the enclosure remains in place. It is also an object of the invention to provide an enclosure assembly that is removable essentially only after removal of the carburetor from the engine.

The use of devices to prevent or interfere with the adjustment of the carburetor idle mixture set screw is known in the prior art. For example, U.S. Pat. No. 3,618,906 to Charron, assigned to the assignee of this invention shows a carburetor idle mixture set screw fitted with a cap 10 having a tang or tab that abuts a boss on the carburetor to permit a limited fuel leaning adjustment of the screw, but prevents the richening of the mixture beyond the factory set without destroying the cap. U.S. Pat. No. 2,618,473, Whitford, shows a locking block or bridging member 28 that connects both idle speed set screws of a two-barrel carburetor to prevent any turning of the set screws so long as the block is in place. U.S. Pat. No. 3,321,195, Korte, shows a carburetor idle speed set screw constructed to cooperate with a key 46 to permit a limited movement of the set screw. U.S. Pat. No. 4,097,561 Seki et al, shows a cap for a carburetor idle speed set screw having a specially formed slot or keyway and a mating configuration in the cap to prevent adjustment of the set screw without the use of a special tool.

It will be seen that in each of the cases above, with the exception of the Whitford reference, the idle speed set screws can be adjusted in at least one direction to change flow through the idle speed channel. And, in the case of Whitford, it is necessary to connect two set screws or one set screw and a dummy, to prevent adjustment.

As stated before, this invention relates to an enclosure for an idle mixture set screw that will not only prevent adjustment of the set screw so long as the enclosure is in place, but prevent access as well, and while the enclosure is capable of being disassembled, this can generally only be done when the carburetor is removed from the engine.

It is a further object of the invention, therefore, to provide a carburetor with an idle mixture set screw assembly that prevents adjustment of the set screw so long as the assembly is locked in place.

It is another object of the invention to provide a set screw enclosure assembly of the type described above that consists of a lower tubular base member or locking plug portion that surrounds the set screw for its axial extent while being spaced radially therefrom, the member having an open end to permit an initial adjustment of the set screw, the base member having a spring lock type engagement with a cap member to totally surround the set screw so that the set screw is then inaccessible for adjustment purposes; the assembly, however, having means to permit removal of the cap from the body member after the carburetor has been disassembled from the engine, without destroying the assembly.

It is still a further object of the invention to provide a set screw enclosure assembly as described above with means to prevent rotation of the enclosure and set screw once the enclosure is located in place.

Figure 2:
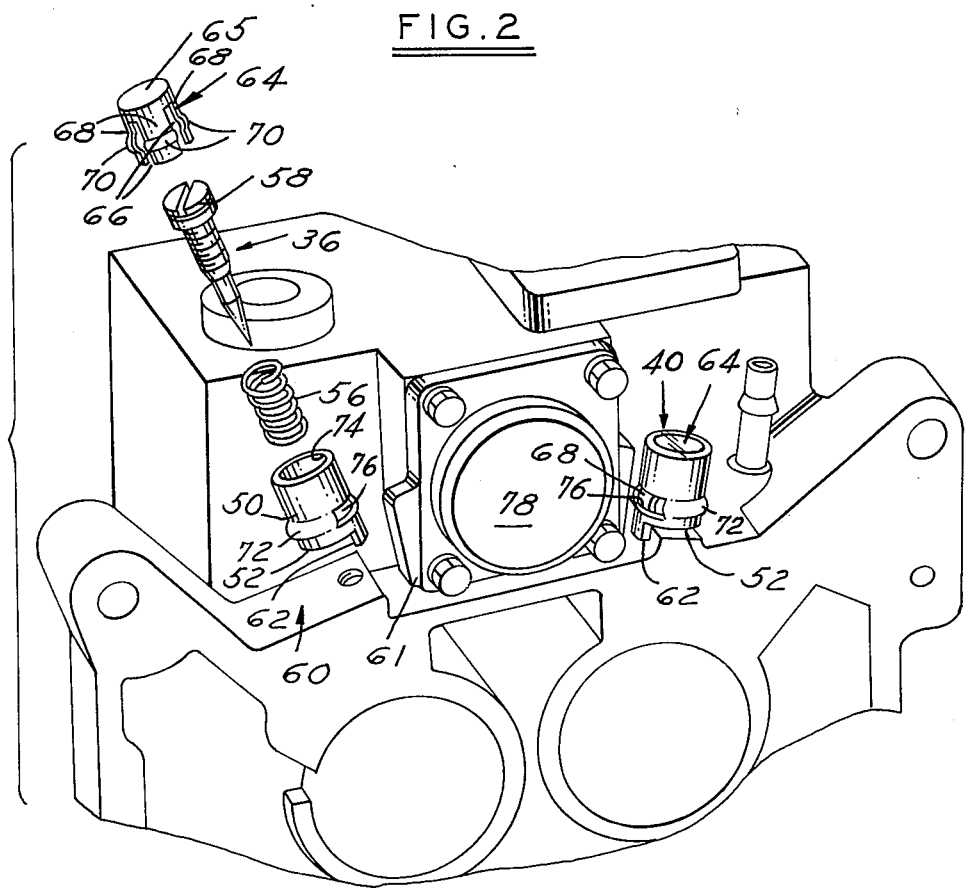

Other objects, features and advantages to the invention will become more apparent on reference to the succeeding detailed description thereof, and to the drawings illustrating the preferred embodiment thereof; wherein, FIG. 1 is a cross-sectional view of a portion of a carburetor illustrating an idling system embodying the invention;

FIG. 1a is an enlarged view of a modified form of the device shown in FIG. 1; and, FIG. 2 is a view of the carburetor of FIG. 1 looking up from the bottom with the carburetor standing essentially on its side.

FIG. 1 shows a portion of the multi-barrel carburetor of the downdraft type. It has a conventional induction passage 10 open at its upper end to air at essentially atmospheric pressure from an air cleaner assembly, not shown. The lower end of the passage is adapted to be connected to the usual engine intake manifold, also not shown by an annular flange 12. The carburetor has the usual boost air/fuel mixture nozzle 14 through which a main supply of fuel is inducted for all part throttle and wide open throttle engine operating conditions. A throttle valve 16 is fixed on a shaft 18 that is rotatably mounted on wall portions of the carburetor body. The carburetor also contains the usual float bowl 20 in which a reservoir of fuel 22 is maitained. The fuel passes through an idle fuel tube 24 located within a main fuel well tube 26 to an idle speed flow passage or channel 28. The upper end of channel 28 contains an idle air bleed 30 for the mixture of air with the fuel. The lower end of channel 28 contains the usual transfer port 32 and a discharge opening 34 that terminates at right angles in induction passage 10. Projecting into the idle speed air/fuel channel 28 and discharge opening 34 is a conventional needle valve type idle fuel adjusting set screw 36 that is threadably mounted in the flange 12 of the carburetor housing as shown.

With throttle valve 16 in the idle speed essentially closed position shown, the suction of the engine below the throttle valve will pull air through the idle air bleed 30 into the mixture channel 28. It will also cause a flow of fuel through the idle tube 24 into channel 28 to mix with the air so that both then flow downwardly to be discharged out the outlet 34 into induction passage 10 to flow to the engine proper. The position of needle valve 36 will determine the quantity of idle speed fuel flow to the engine. The initial setting of needle valve 36 would be made at the factory, and further adjustments normally would not be necessary or desirable other than if the carburetor were to be disassembled from the engine for overhaul or similar operations.

As stated previously, the purpose of this invention is to maintain the setting of needle valve 36 in the position determined by the factory; i.e., to prevent or hinder an adjustment of the needle valve other than when it becomes necessary to do so upon complete disassembly of the carburetor from the engine.

To this end, the enclosure assembly 40 for the set screw consists of a lower tubular or cup-shaped sheet metal base member 50 that is radially spaced from and surrounds the set screw 36 essentially for the axial extent of the set screw. The flat end or base 52 of member 50 is essentially closed except for an opening 54 that is slightly larger than the threads of needle valve 36 so as to freely accommodate the initial setting or adjustment of the needle valve at the factory. The remaining area of the base 52 constitutes an internal seat for one end of a spring 56, the other end of which seats against the underside of the cap 58 of set screw 36. The force of spring 56, therefore, constantly urges set screw 36 in an outward direction while at the same time urging the tubular base member 50 against the body portion 60 of the carburetor with which it is contiguous. The base member or locking plug portion 50 has a locking tab or tang 62 projecting downwardly from the base 52 to be contiguous with the side or corner of body portion 60 upon which the base member rests, and to cooperate with a lug 61 to prevent rotation of the tubular locking plug or base member 50.

The upper or outer portion of enclosure assembly 40 consists of an inverted cup-like spring steel sheet metal cap 64 that has a closed end or cover 65. It also has a number of circumferentially spaced axial slots 66 defining spring lock-like fingers 68 that are adapted to fit inside the lower locking plug portion 50. Each of the fingers includes a circumferentially extending raised portion or bead 70 that is adapted to operate with a mating circumferentially extending bead 72 formed on the tubular base member 50. The cap 64 is assembled to base member 50 over the idle speed set screw 34 by inserting fingers 68 into the open end 74 of base member 50 and nesting the case and base member together until the raised bead 70 on the cap mates with the raised bead 72 on the tubular member. This will lock the two in place in a spring-like manner with a detent type connection. Because of the spring-like fingers 68, however, cap 64 may be separated from body member 50 whenever adjustment becomes necessary, but only after the carburetor has been removed from the engine. For this purpose, the body member 50 is provided with an arcuate opening or a slot 76 provided in essentially a 90° arcuate portion of bead 72 so that access of a tool to the finger portion 68 of the cap 64 may be had to pry the cap from the body portion.

FIG. 2 shows that slot 76 is essentially inaccessible for the insertion of a tool therein so long as the carburetor is assembled to the engine since essentially no clearance space exists for this purpose between the carburetor mounting flange portion 60 and the engine manifold and carburetor power valve cover 78, for example.

FIG. 1a shows a modified form of the enclosure assembly illustrated in FIG. 1. Essentially the only difference between the two assemblies is that the body portion 50 in FIG. 1a is flared at its upper end portion 80 instead of being the continuous diameter tubular portion shown in FIG. 1. In all other respects, the details of construction and assembly and operation are the same as in connection with the embodiment shown in FIG. 1.

From the foregoing, it will be seen that the invention provides an enclosure assembly for a carburetor idle speed set screw that prevents adjustment of the set screw so long as the enclosure assembly is in place, and that the assembly can not be easily removed unless the carburetor is removed from the engine proper. It will also be seen that when the enclosure assembly is in place, there is no access to the idle mixture set screw for adjustment purposes.

While the invention has been shown and described in its preferred embodiments, it will be clear to those skilled in the arts to which it pertains that many changes and modifications may be made thereto without departing from the scope of the invention.

We claim:

1. An assembly for enclosing the engine idle speed mixture flow adjusting screw of a carburetor to prevent adjustment of the screw so long as the assembly is in place, comprising, in combination, a carburetor body portion having an opening into an engine idle speed mixture flow channel, a needle valve type screw adjustably mounted for movement into and out of the opening to vary mixture flow through the channel, a cup-shaped base member mounted on the carburetor body portion adjacent the opening and extending outwardly therefrom to surround a portion of the screw, and a cap resiliently and nestingly engagable with the outer open end of the base member to complete enclosure of the screw and prevent access thereto for adjustment of the screw so long as the cap and base member are engaged, the cup-shaped member comprising a tubular member closed at one end, the one end containing an aperture accommodating movement therethrough of the screw, a tab projecting from the one end for engagement with the carburetor body portion to prevent relative rotation therebetween, spring means surrounding the needle valve screw between a head on the screw and the base of the tubular member against the carburetor body portion to yieldably hold the assembly in position against the carburetor body portion, the tubular member having a raised bead extending circumferentially around a portion of the member, the cap having a tubular cup-shape with the open end facing the open end of the base member and having a closed cover end and a number of axially extending circumferentially spaced slots in the cap tubular portion constituting resilient fingers, a raised circumferentially extending bead on each of the fingers adapted to mate with the bead on the base member when the base member and cap are nested to form a spring-like locking engagement therebetween completely covering the screw, and an opening through the bead on the base member through which protrudes a portion of the bead on the cap when the cap and base member are nested to permit dissembly of the cap from the base.

* * * * *